(12) United States Patent
Sato et al.

(10) Patent No.: US 6,379,771 B1
(45) Date of Patent: Apr. 30, 2002

(54) SHEET-LIKE STRUCTURE MATERIAL AND MANUFACTURING METHOD

(75) Inventors: Kan'ichi Sato; Masayuki Oishi, both of Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 09/172,252

(22) Filed: Oct. 14, 1998

(30) Foreign Application Priority Data

Nov. 12, 1997 (JP) .............................................. 9-309113

(51) Int. Cl.[7] .................................................. B32B 3/02
(52) U.S. Cl. ........................ 428/81; 52/204.71; 52/308; 52/309.1; 428/68; 428/192; 428/428; 428/437; 428/440
(58) Field of Search ............................ 428/192, 68, 34, 428/81, 428, 437, 440; 52/204.595, 204.71, 308, 309.1

(56) References Cited

U.S. PATENT DOCUMENTS

| | | | |
|---|---|---|---|
| 3,666,614 A | 5/1972 | Snedecker et al. | 161/183 |
| 5,322,660 A | 6/1994 | Hickman | 264/261 |
| 5,585,188 A | * 12/1996 | Cheron et al. | 428/426 |
| 5,667,897 A | 9/1997 | Hashemi et al. | 428/426 |
| 5,853,828 A | * 12/1998 | Schimmelpenningh et al. | 428/34 |

FOREIGN PATENT DOCUMENTS

| | | |
|---|---|---|
| WO | WO 96/12604 | 2/1996 |
| WO | WO 97/39869 | 10/1997 |

* cited by examiner

*Primary Examiner*—Nasser Ahmad
(74) *Attorney, Agent, or Firm*—Armstrong, Westerman & Hattori, LLP

(57) ABSTRACT

The invention discloses a sheet-like structure material and its manufacturing method. The sheet-like structure material has the advantages that impact imposed on its edge ends can be adsorbed to protect its adherends, and that the labor required for installing it and edge ends treatment can be significantly saved. The structure material comprises an outer peripheral structure which has elasticity and is integrally formed at the outer periphery of a sheet-like composite body comprising two glass sheets and an intermediate resin layer disposed between the glass sheets. The outer peripheral structure is formed from a resinous material used for forming the intermediate resin layer, by allowing the material to ooze from between the glass sheets.

8 Claims, 5 Drawing Sheets

SHEET-LIKE STRUCTURE MATERIAL AND MANUFACTURING METHOD

TECHNICAL FIELD

The present invention relates to a sheet-like structure material having an intermediate resin layer between two adherends such as glass sheets. The invention also relates to a method for manufacturing the sheet-like structure material.

BACKGROUND ART

Known laminated glass is formed from two sheets of plate glass with an adhesive film between, the whole being laminated together by thermocompression bonding. In such laminated glass 51, the edge ends of glass sheets 52, 53 around the periphery are uncovered as shown in FIG. 5(*a*).

The glass sheets are liable to break off if a something strikes against their uncovered edge ends. When such laminated glass 51 is fit into a framework 54 such as a metallic sash as shown in FIG. 5(*b*), the edge ends of the glass sheets 52, 53 come into direct contact with the framework 54. In this condition, if the framework 54 is rapidly cooled, the grass sheets 52, 53 will be cracked because of the difference in temperature between the edge ends and center of each glass sheet. Note that reference numeral 55 in FIG. 5(*b*) represents a rubber seal.

To solve this problem, when the laminated glass 51 is fit into the framework 54 such as a metallic sash, a setting block (heat insulating block) 56 is usually placed under the laminated glass 51 as shown in FIG. 5(*c*), thereby interrupting heat transmission between the glass sheets 52, 53 and the framework 54.

However the setting block process is employed, there still remains the risk of braking the unprotected edge ends of the pane during transportation and handling. Further, the conventional method shown in FIG. 5(*c*) requires the installation of the setting block, resulting in complicated fitting process. Another disadvantage is that when applying finishing treatment to the laminated glass according to the conventional process, it is very troublesome to chamfer the edge ends of the laminated glass and particularly to finish the gradually changed edge from round cut corner to the straight cut in the laminated glass.

The present invention is directed to overcoming the foregoing problems and it is accordingly a primary object of the invention to provide a sheet-like structure material and its manufacturing method, the sheet-like structure material being capable of absorbing impact imposed on its edge ends to protect its adherends and requiring much less labor for installation work and end face treatment.

DISCLOSURE OF THE INVENTION

The above object can be achieved by a sheet-like structure material embodying the invention, wherein an outer peripheral structure having elasticity is integrally formed at the outer periphery of a sheet-like composite body comprising a first adherend, a second adherend and an intermediate resin layer sandwiched between the first and second adherends.

According to the invention, the outer periphery of a sheet-like composite body comprising two adherends and an intermediate resin layer is integrally surrounded by an outer peripheral structure having elasticity. With this arrangement, even if impact is imposed on the edge ends of the sheet-like structure material such as laminated glass, the impact is adsorbed by the outer peripheral structure, thereby protecting the sheet-like composite body. Further, the edges of the adherends do not hurt the workers who deal with the sheet-like structure material. When setting the sheet-like structure material in a framework such as a sash, the adherends such as glass do not come into direct contact with the framework, which brings about heat insulating effects. Therefore, even if the framework is rapidly cooled, the edge ends of each adherend will not differ from its center in temperature, so that there is no danger of cracking the adherends. When setting the sheet-like structure material of the invention in a framework or when applying chamfering treatment to its edge ends, no complicated process is involved. It should be noted that the thickness of the outer peripheral structure can be arbitrarily determined according to the size of the framework.

In the invention, the outer peripheral structure may be formed from a resinous material from which the intermediate resin layer is to be formed and which is oozing from between the first and second adherends. With this, not only can the outer peripheral structure be formed with ease, for example, by injection and press molding but also the outer peripheral structure can be easily adhered to other outer peripheral members since the resinous material of the outer peripheral structure serves as an adhesive agent. In this injection and press molding, the intermediate resin layer and the outer peripheral structure are formed by spreading the molten resinous material through uniform application of pressure to the whole molten resinous material. The molded product produced by this method is free from defects in joining the adherends to the resin layer. Additionally, no stress strain is generated in this method since the resin layer is formed by uniformly applying pressure to the whole molten resinous material so as to cause the material to spread. The outer peripheral structure may be formed from only the same resinous material as that of the intermediate resin layer. In this case, the outer peripheral structure and the sheet-like composite body can be molded at the same time, which simplifies the molding process. Alternatively, the outer peripheral structure may be composed of a part formed from the same resinous material as that of the intermediate resin layer and a part formed from a resinous material different from the resinous material of the intermediate resin layer. This alternative embodiment can be put in practice by only interposing a member (i.e., outer peripheral member), which is made of a material different from the resinous material of the intermediate resin layer, between the dies during molding so that the outer peripheral member is easily formed in an integral manner. This makes it possible to produce highly value-added products through a simple molding process.

Preferably, the resinous material of the intermediate resin layer is a thermoplastic resinous material having a tensile elastic modulus of 1,000 kg/cm$^2$ or less. Use of such a thermoplastic resinous material can prevent the adherends such as glass from breaking even if the resinous material contracts or expands owing to changes in temperature. The thermoplastic resinous material is selected from thermoplastic elastomers (TPE) including polyvinyl butyral (PVB), ethylene-vinyl acetate copolymer (EVA) and thermoplastic polyurethane (TPU). These materials are preferable, particularly when forming the outer peripheral structure and the intermediate resin layer from the same material.

Preferable examples of the material different from the resinous material of the intermediate resin layer include neoprene rubber, wood, neoprene rubber foam, urethane foam, polypropylene foam and polyethylene foam. Use of a material selected from the above examples allows the resultant sheet-like structure material to be used in various applications.

The first and second adherends may be formed from the same material or different materials selected from inorganic materials such as glass and silicon and from organic materials such as polycarbonate and acrylic resin. Use of such materials allows the resultant sheet-like structure material to be used in various applications such as the front glass, side glass and rear glass of automobiles and ordinary building materials.

According to the invention, there is provided a first method for manufacturing a sheet-like structure material, comprising the steps of:

placing a first adherend and a second adherend between dies in a compression molding machine so as to be in close contact with the dies respectively;

filling a mold cavity with a molten resinous material to integrally mold an intermediate resin layer and an outer peripheral structure, the intermediate resin layer being formed between the first and second adherends, the outer peripheral structure having elasticity and being formed at the outer peripheries of the first and second adherends and of the intermediate resin layer.

According to the above sheet-like structure material manufacturing method, the first and second adherends are placed between the dies of the compression molding machine and brought into close contact with the dies respectively, for instance, by vacuum suction. In this condition, the mold cavity is filled with a molten resinous material so that the intermediate resin layer is formed from this molten resinous material between the first and second adherends, integrally with the outer peripheral structure which has elasticity and is formed from the molten resinous material oozing from between the first and second adherends, enclosing the outer peripheries of the adherends and the intermediate resin layer. The configuration of the outer peripheral structure is thus formed by transferring a die pattern to the molding resin and therefore even if the finished pane shape has a round cut or straight cut shape, elaborate finishing can be easily accomplished by molded peripheral structure.

According to the invention, there is provided a second method for manufacturing a sheet-like structure material, comprising the steps of;

placing a first adherend and second adherend between dies in a compression molding machine so as to be in close contact with the dies respectively;

placing a preformed outer peripheral member at the outer peripheries of the first and second adherends;

filling a mold cavity with a molten resinous material to integrally mold an intermediate resin layer, an outer peripheral structure and an outer peripheral member, the intermediate resin layer being formed between the first and second adherends, the outer peripheral structure having elasticity and being formed at the outer peripheries of the adherends and of the intermediate resin layer.

In the above sheet-like structure material manufacturing method, the first and second adherends are placed between the dies of a compression molding machine and brought into close contact with the dies respectively, for instance, by vacuum suction. At the same time, a preformed outer peripheral member is placed at the outer peripheries of the adherends. In this condition, the mold cavity is filled with a molten resinous material. As a result, the intermediate resin layer is formed between the first and second adherends, from this molten resinous material. From the molten resinous material oozing from between the first and second adherends, the outer peripheral structure having elasticity is formed so as to enclose the outer peripheries of the adherends and of the intermediate resin layer. The outer peripheral member is adhered to (combined with) the outer peripheral structure so that the adherends, the intermediate resin layer, the outer peripheral structure and the outer peripheral member are all integrated. This method can provide highly value-added products, by suitably selecting material and shape for the outer peripheral member.

In both of the above manufacturing methods, when filling the mold cavity with the molten resinous material, it is preferred to perform compression molding by clamping both dies so as to uniformly apply pressure to the whole molten resinous material, thereby causing the material to spread. With this arrangement, defects in joining the adherends and the intermediate resin layer can be avoided and no stress strain is generated because the intermediate resin layer is formed by spreading the molten resinous material through uniform application of pressure to the whole molten resinous material.

BEST MODE FOR CARRYING OUT THE INVENTION

Figure 1:
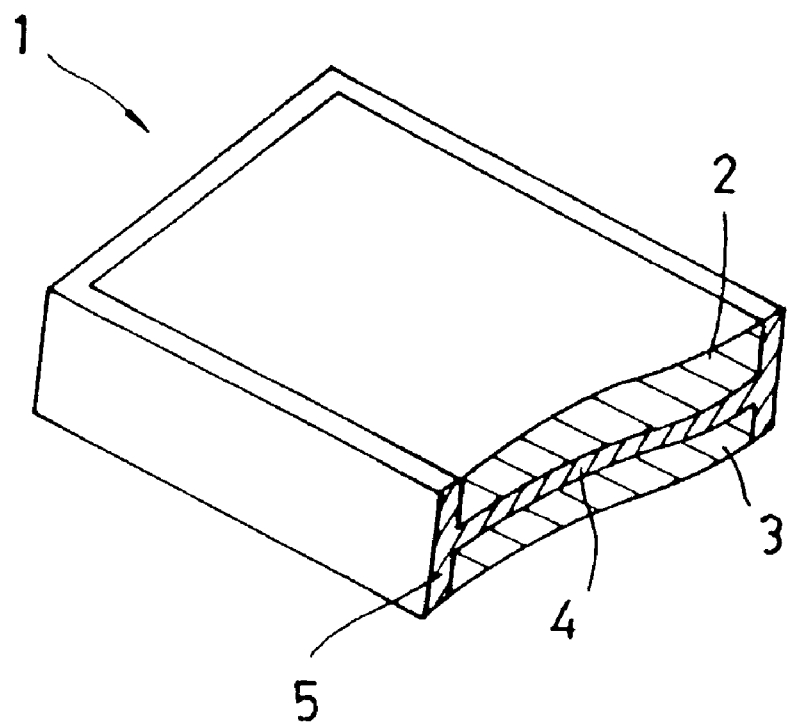
FIG. 1 is a partially cut perspective view of a sheet-like structure material manufactured according to a first embodiment of the invention.

Referring now to the drawings, preferred embodiments of the sheet-like structure material and manufacturing method according to the invention will be explained.

(First Embodiment)

FIG. 1 shows a partially cut perspective view of a pane of laminated glass embodying the sheet-like structure material of a first embodiment of the invention.

The laminated glass pane 1 has a laminated structure comprising rectangular glass sheets 2, 3 serving as the first and second adherends; an intermediate resin layer 4 formed from a thermoplastic resinous material and sandwiched between the glass sheets 2, 3; and an outer peripheral structure 5 that is formed at the outer periphery of the laminated glass pane 1 integrally with the intermediate resin layer 4, being made of the same resinous material as that of the intermediate resin layer 4.

The resinous material of the intermediate resin layer 4 and the outer peripheral structure 5 is adhesive to the glass sheets 2, 3 and has rubber-like elasticity so that it adsorbs a shock to protect the glass sheets 2, 3 if impact is imposed on the edge ends of the glass sheets 2, 3. The resinous material preferably has a tensile elastic modulus of 1,000 kg/cm$^2$ or less so that it does not cause damage to the glass sheets 2, 3 even if it contracts or expands. Such a resinous material is selected from thermoplastic elastomers (TPE) including polyvinyl butyral (PVB), ethylene-vinyl acetate copolymer (EVA) and thermoplastic polyurethane (TPU). These resinous materials have low heat conductivities that are about one fourth the heat conductivity of glass. For instance, PVB has a heat conductivity of 0.14 kcal/mh° C. at 20° C., while glass has a heat conductivity of 0.65 kcal/mh° C. at 0° C. These resinous materials have heat insulating effects so that when the laminated glass pane 1 is attached to a framework such as a sash, the glass sheets 2, 3 do not come into direct contact with the framework and are not affected by temperature changes by virtue of the heat insulating effects of the resinous material.

The laminated glass pane 1 is produced in the following manufacturing process (see FIG. 2), using a compression molding machine.

(1) Setting Step

While a movable die 7 being opened with respect to a fixed die 6, the glass sheets 2, 3 are respectively placed at their specified positions within the dies 6, 7. Specifically, the glass sheets 2, 3 are held on the center of each die by vacuum suction such that a mold cavity is created so as to surround the glass sheets 2, 3 and that the glass sheets 2, 3 are respectively in close contact with the surface of each die 6, 7 without a clearance between.

(2) Die closing and movable die locking step (FIG. 2(a))

The movable die 7 is forwardly moved to the fixed die 6 until a specified spacing $l_1$ (not shown) is obtained between the glass sheets 2, 3 and then the movable die 7 is locked. Subsequently, the movable die 7 is moved toward the fixed die 6 until the spacing between the glass sheets 2, 3 becomes equal to compression allowance $l_2$ ($l_2 < l_1$).

(3) Injection feeding step (FIG. 2(b))

When the movable die 7 and the fixed die 6 are positioned with the spacing between the glass sheets 2, 3 being equal to the compression allowance $l_2$, an opening/closing valve 9 disposed at a nozzle 8 of the injection unit is opened and a injector (not shown) disposed on the base side is operated to move forward, whereby a molten resinous material 12 is injected into a mold cavity 11 through a gate 10.

(4) Mold cavity compression step (FIG. 2(c))

During the injection of the molten resinous material 12 into the mold cavity 11, the movable die 7 is forwardly moved to the fixed die 6 to reduce the volume of the mold cavity 11 while keeping the dies 6, 7 parallel to each other. With this operation, pressure is uniformly applied to the whole molten resinous material 12 being injected, thereby causing the material to spread. Note that the pressure applied to the molten resinous material 12 is high enough to restrict the development of gas contained in the molten resinous material 12 into air bubbles. The forward moving (compression) amount of the movable die 7 at that time corresponds to the length obtained by subtracting the final thickness of the resin present between the glass sheets 2, 3 from the compression allowance $l_2$. It should be noted that when the molten resinous material 12 has been injected into the molding cavity 11 in an amount required for molding, the opening/closing valve 9 is closed.

(5) Holding and cooling step (see FIG. 2(d))

After reducing the volume of the molding cavity 11, holding pressure is applied to hold the dies until the spread, molten resinous material 12 is cooled and joined to the surfaces of the glass sheets 2, 3.

(6) Die opening and ejecting step (see FIG. 2(e))

The movable die 7 is unlocked to allow the movable die 7 to move backward and then the molded product is removed from the dies.

Figure 3:
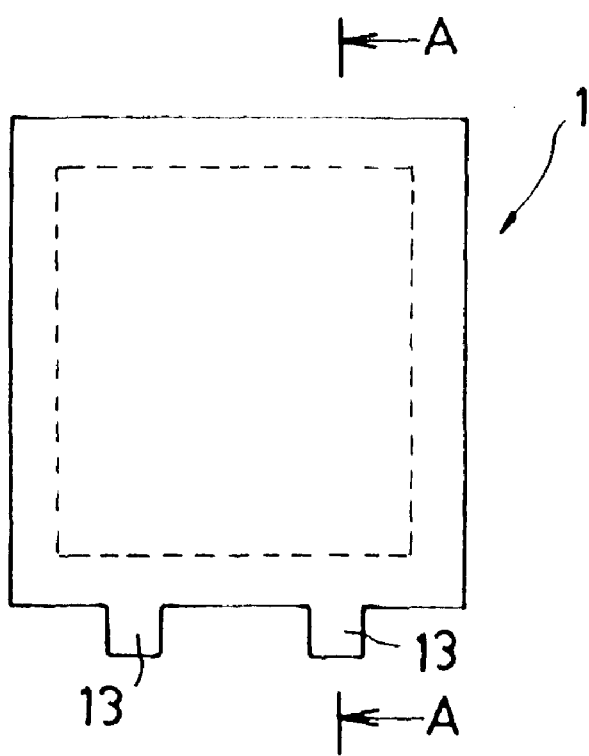
FIGS. 3(a) and (b) shows one example of molded products manufactured according to the first embodiment.
Figure 3:
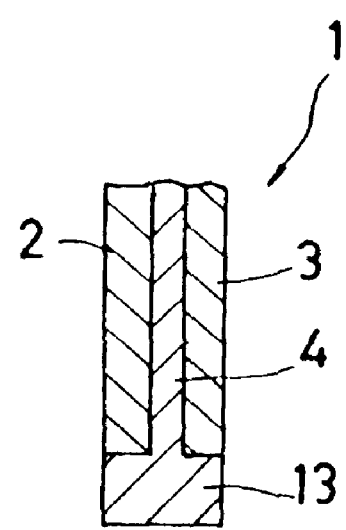

As described above, the outer peripheral structure 5 on the periphery of the laminated glass pane 1 is formed from the resinous material for forming the intermediate resin layer 4, which is oozing from between the adherends, that is, the two glass sheets 2, 3. Therefore, the outer peripheral structure 5 can be easily molded using a compression molding machine. Further, for setting the laminated glass pane 1 in a framework such as a sash, installation work as well as chambering of edge ends can be extremely simplified. The thickness of the outer peripheral structure 5 can be arbitrarily determined according to the size of the framework and sides which are not surrounded by the outer peripheral structure can be formed if necessary, only by substantially eliminating the cavity between the glass sheets 2, 3 and the dies. FIG. 3 shows one example of molded products produced according to this embodiment (FIG. 3(a) is a front view and FIG. 3(b) is a partial view taken on line A—A of FIG. 3(a)). In this example, a setting block (heat insulating block) 13 is formed in an integral manner under the laminated glass pane 1, as part of the outer peripheral structure.

According to the first embodiment, even if impact is imposed on the edge ends of the laminated glass pane 1, the outer peripheral structure 5 adsorbs the impact thereby protecting the glass sheets 2, 3. Additionally, the edge ends of the glass sheets 2, 3 do not hurt the workers. When setting the laminated glass pane 1 in a framework such as a sash, the edge ends of the glass sheets 2, 3 do not come into direct contact with the framework so that desired heat insulating effects can be achieved and as a result, even if the framework is rapidly cooled, the glass sheets 2, 3 are not liable to crack due to the difference in temperature between their edge ends and center of the parts. Since the outer peripheral structure 5 constitutes the edge ends of the laminated glass pane 1, there is no need to apply treatment such as chamfering and polishing the edge ends of the laminated glass.

Figure 2:
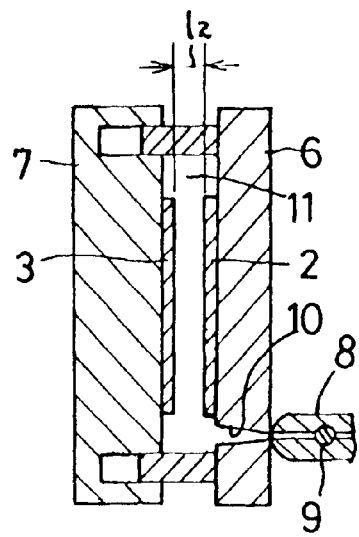
FIGS. 2(a) to 2(e) illustrate steps for manufacturing the sheet-like structure material according to the first embodiment.
Figure 2:
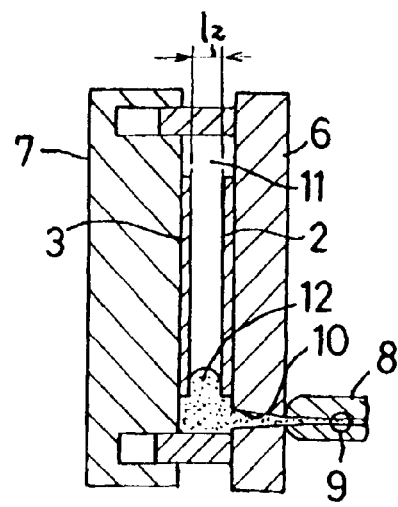
Figure 2:
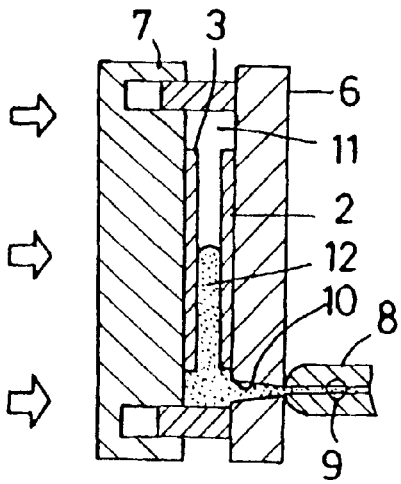
Figure 2:
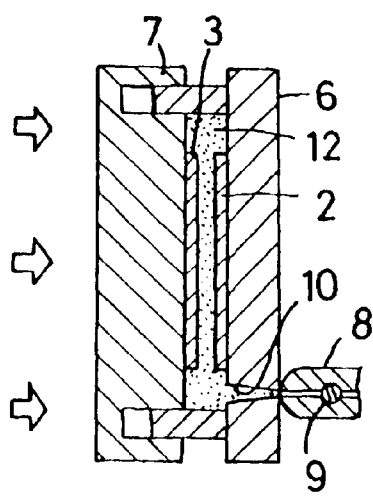
Figure 2:
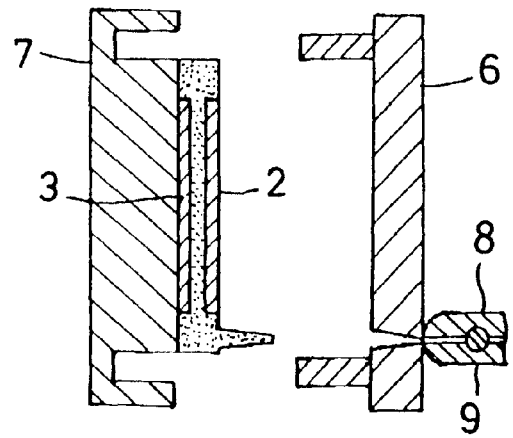

In cases where the part of the mold cavity 11 which corresponds to the outer peripheral structure is thick as shown in FIG. 2 and such a mold cavity 11 is charged by ordinary injection molding, an undesirable situation is often encountered in which the thick part corresponding to the outer peripheral structure is first filled with the resinous material and then, the resinous material gets stuck, causing a difficulty in filling the thin part, or in which there arises a difficulty in molding if the flow rate of the resinous material drops during filling of the thick part. This problem can be solved by the use of the above-described molding method (injection and press molding) so that the product such as described in this embodiment can be easily produced.

(Second Embodiment)

FIGS. 4(a) and 4(b) show a front view and partial cross sectional view taken on line B—B, respectively, of a molded product manufactured according to a second embodiment of the invention.

Figure 4:
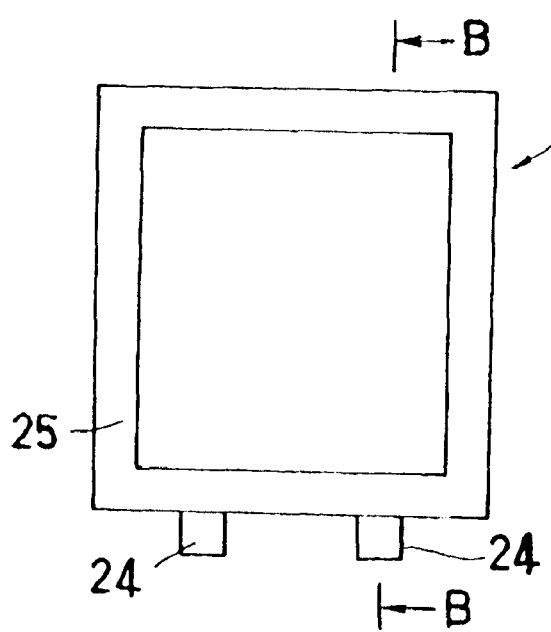
FIGS. 4(a) and 4(b) shows one example of molded products manufactured according to a second embodiment of the invention.
Figure 4:
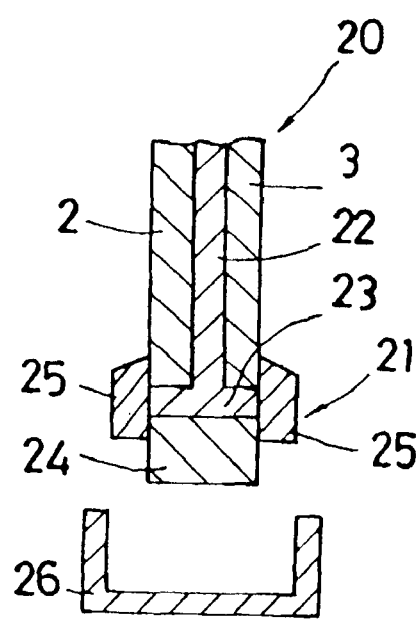
Figure 5:
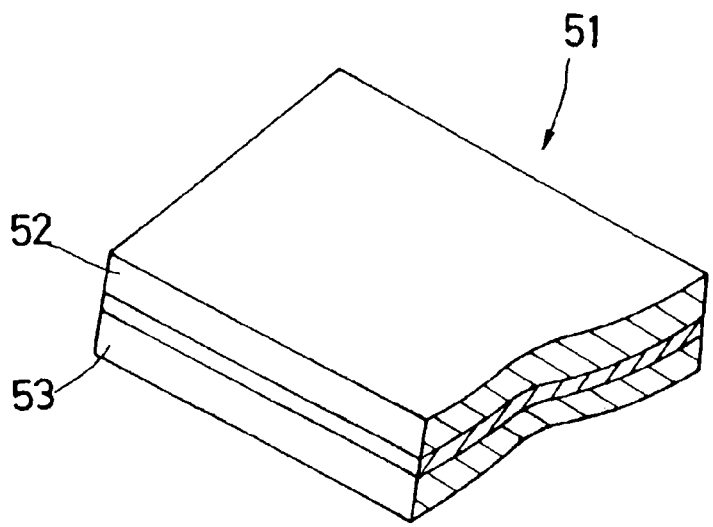
FIGS. 5(a)–5(e) shows laminated glass according to a prior art.
Figure 5:
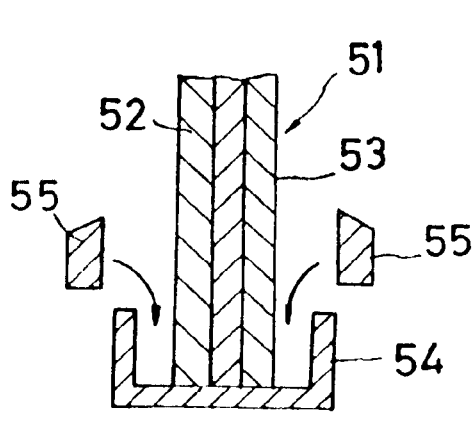
Figure 5:
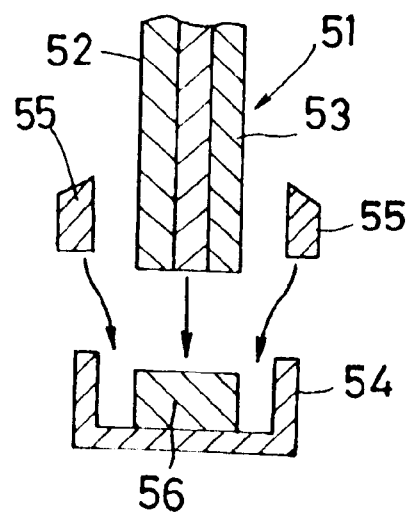

While there has been described in the first embodiment a laminated glass pane having the outer peripheral structure 5 and the intermediate resin layer 4 which are formed from the same material, a laminated glass pane 20 according to the second embodiment has an outer peripheral structure 21 composed of a first portion 23, a second portion 24 and a third portion 25, the first portion 23 being made of the same material as that of an intermediate resin layer 22 and formed so as to cover the end faces of the glass sheet 2, 3, the second and third portions 24, 25 being made of materials different from that of the intermediate resin layer 22 and formed outside the first portion 23. The second portion 24 is a safety block and the third portion 25 is sealing rubber. In FIG. 4, reference numeral 26 designates a framework such as a sash.

For producing the laminated glass pane 20 of this embodiment, preformed outer peripheral members (corresponding to the second and third portions 24, 25) are placed within the dies and then, injection and press molding similar to the first embodiment is carried out. During the molding, the resinous material for forming the intermediate resin layer 22 oozes from between the glass sheets 2, 3, forming the first portion 23 of the outer peripheral structure 21. The second portion 24 and third portion 25 placed on the edge corner side and side face side, respectively, of the first portion 23, are integrally joined to (combined with) the first portion 23, thereby completing the molding.

In this embodiment, examples of the materials of the outer peripheral members include neoprene rubber, wood, neoprene rubber foam, urethane foam, polypropylene foam and polyethylene foam.

According to the second embodiment, by simply interposing an outer peripheral member between the dies during molding, the outer peripheral member made of a material different from the resinous material of the intermediate resin layer and the intermediate resin member can be easily molded in an integral manner, so that laminated glass having a setting block or sealing rubber integral therewith can be easily formed. This means that highly value-added products can be manufactured through a simple molding process, by adopting the method of the second embodiment. In addition, if the outer peripheral structure 5 of the laminated glass according to the first embodiment is vulnerable to chemical attack for instance, this problem may be solved by joining an outer peripheral member to the laminated glass as described in the second embodiment, so that the outer peripheral structure 5 is no longer exposed to chemically harmful environment.

Although glass sheets are used as the adherends in the first and second embodiments, other inorganic materials such as silicon and organic plastic materials such as polycarbonate and acrylic resin may be used solely or in combination for the adherends.

What is claimed is:

1. A molded product having a substantially sheet configuration, comprising: a composite body; and
    at least a part of an outer peripheral structure having elasticity and being integrally formed at the outer periphery of the composite body, the composite body having a first adherend, a second adherend and an intermediate resin layer sandwiched between the entire inner surfaces of the first and second adherends, wherein the at least a part of the outer peripheral structure and the intermediate resin layer is of a molded single piece of resinous material, and surfaces of said outer peripheral structure are flush with outer surfaces of the first and second adherends.

2. A molded product according to claim 1, wherein the outer peripheral structure and the intermediate resin layer are made of the same resinous material.

3. A molded product according to claim 1, wherein the intermediate resin layer and the at least a part of the outer peripheral structure are made of the same resinous material, the resinous material being formed by a process comprising the steps of uniformly applying pressure to a whole molten resinous material such that the molten resinous material spreads.

4. A molded product according to claim 1, wherein the outer peripheral structure is composed of a part formed from the same resinous material as the resinous material of the intermediate resin layer and a part formed from a resinous material different from the resinous material of the intermediate resin layer.

5. A molded product according to claim 4, wherein the resinous material different from the resinous material of the intermediate resin layer is selected from the group consisting of neoprene rubber, wood, neoprene rubber foam, urethane foam, polypropylene foam and polyethylene foam.

6. A molded product according to any one of claims 1, 2, 3 and 4, wherein the resinous material of the intermediate resin layer is a thermoplastic resinous material having a tensile elastic modulus of 1,000 kg/cm$^2$ or less.

7. A molded product according to claim 6, wherein the thermoplastic resinous material is a thermoplastic elastomer (TPE).

8. A molded product according to claim 1, wherein the first and second adherends are formed from the same material or different materials selected from the group consisting of inorganic materials and silicon and organic materials.

* * * * *